United States Patent
Ko

(10) Patent No.: US 7,614,061 B2
(45) Date of Patent: Nov. 3, 2009

(54) TRAY LOADING/UNLOADING APPARATUS

(75) Inventor: Yu-Cheng Ko, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 339 days.

(21) Appl. No.: 11/557,952

(22) Filed: Nov. 8, 2006

(65) Prior Publication Data

US 2007/0169133 A1 Jul. 19, 2007

(30) Foreign Application Priority Data

Jan. 18, 2006 (CN) .................... 2006 1 0033267

(51) Int. Cl.
*G11B 17/14* (2006.01)
(52) U.S. Cl. ..................... 720/602; 720/607
(58) Field of Classification Search .......... 720/601–616
See application file for complete search history.

(56) References Cited

U.S. PATENT DOCUMENTS

| 6,005,833 A | 12/1999 | Yasuma et al. |
| 6,621,784 B2 | 9/2003 | Liao et al. |
| 2001/0019526 A1* | 9/2001 | Takeda ................. 369/75.2 |
| 2003/0227836 A1* | 12/2003 | Inoue ................. 369/30.36 |
| 2005/0052959 A1* | 3/2005 | Chang ................. 369/30.27 |
| 2005/0188390 A1* | 8/2005 | Kuo et al. ................. 720/621 |
| 2005/0249101 A1 | 11/2005 | Tokunaga |

\* cited by examiner

*Primary Examiner*—Andrea L Wellington
*Assistant Examiner*—Gustavo Polo
(74) *Attorney, Agent, or Firm*—Winston Hsu

(57) ABSTRACT

A tray loading apparatus includes a tray, a motor, a drive circuit. The tray is movable between a load position and an unload position. The motor is constructed and arranged for bringing the tray to move from the unload position to the load position. The drive circuit is used for apply a loading voltage to the motor and the loading voltage includes at least one gradually increasing stage. A tray unloading apparatus and an optical disc drive are also provided.

18 Claims, 8 Drawing Sheets

TRAY LOADING/UNLOADING APPARATUS

BACKGROUND OF THE INVENTION

1. Field of the Invention

This invention relates to optical disc drives and, more particularly, to a tray loading/unloading apparatus of an optical disc drive.

2. Description of Related Art

Optical disc drives, such as video compact disc (VCD) players, digital versatile disc (DVD) players, or computer data disc reading/writing drives are widely used for recording information onto and/or reproducing information from discs.

Most optical disc drives use trays to load and unload discs. As shown in FIG. 7, a traditional optical disc drive 10 includes a tray 12, a set of gears 14, and a motor 16. The motor 16 connects to the set of gears 14 via a belt 18. The set of gears 14 meshes with a gear rack 122 formed on the tray 12.

The motor 16 drives the set of gears 14 to rotate via the belt 18, so as to bring the tray 12 to move linearly between a load position and an unload position. When the tray 12 is ejected out of the traditional optical disc drive 10 to the unload position, an optical disc (not shown) can be placed on/removed from the tray 12. When the tray 12 is inserted to the load position, the traditional optical disc drive 10 can reproduce/record information from/on the optical disc.

A moving speed of the tray 12 is determined by a rotational speed of the motor 16, and the rotational speed of the motor 16 is controlled by a voltage fed to the motor 16. In other words, the voltage determines the moving speed of the tray 12. Referring also to FIG. 8, a constant voltage is applied to drive the motor 16. In order to shorten a(n) loading/unloading time, the constant voltage is usually set to a relatively high voltage value. When the optical disc drive 10 starts loading the tray 12 from the unload position, the voltage applied to the motor 16 increases from zero to a relatively high voltage value instantaneously. Thus the motor 16 accelerates to a high rotational speed in a very short time, this may produce unwanted vibrations on the tray 12. Similarly, during the end of an unload process, the constant voltage is terminated instantaneously when the tray 12 reaches the unload position. Vibrations may also occur as the tray 12 stops instantly from a high speed in a short time.

Therefore, a loading/unloading apparatus which is capable of reducing the unwanted vibrations is desired.

SUMMARY OF THE INVENTION

A tray loading apparatus includes a tray, a motor, a drive circuit. The tray is movable between a load position and an unload position. The motor is constructed and arranged for bringing the tray to move from the unload position to the load position. The drive circuit is used for apply a loading voltage to the motor and the loading voltage includes at least one gradually increasing stage.

A tray unloading apparatus includes a tray, a motor, a drive circuit. The tray is movable between a load position and an unload position. The motor is constructed and arranged for bringing the tray to move from the load position to the unload position. The drive circuit is used for apply an unloading voltage to the motor and the unloading voltage includes at least one gradually decreasing stage.

An optical disc drive includes a tray, a motor, a drive circuit, and a control circuit. The tray is movable between a load position and an unload position. The motor is used for driving the tray to move between the load position and the unload position. The drive circuit is used for outputting a voltage to drive the motor. The control circuit is used for sending commands to the drive circuit to control the voltage applied to the motor, wherein the voltage comprise at least one gradually increasing stage when loading the tray and at least one gradually decreasing stage when unloading the tray.

Other advantages and novel features will become more apparent from the following detailed description of preferred embodiments when taken in conjunction with the accompanying drawings, in which:

BRIEF DESCRIPTION OF THE DRAWINGS

Many aspects of the tray loading/unloading apparatus can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

DETAILED DESCRIPTION OF THE INVENTION

Reference will now be made to the drawings to describe the preferred embodiment of the present tray loading/unloading apparatus, in detail.

Figure 1:
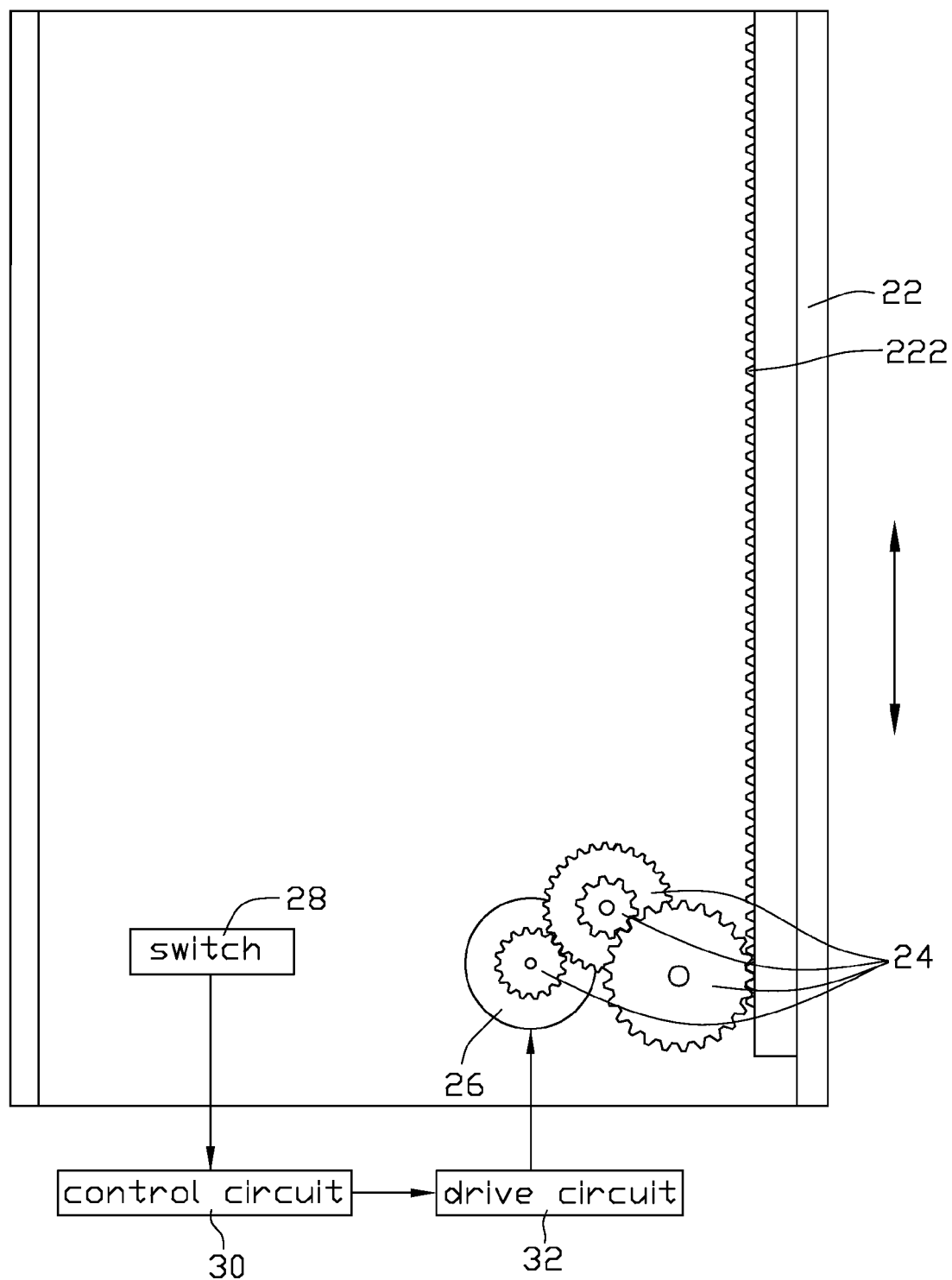
FIG. 1 is a schematic diagram of an optical disc drive in accordance with an exemplary embodiment, the optical disc drive including a motor.

Referring to FIG. 1, an optical disc drive 20 includes a tray 22, a set of gears 24, a motor 26, a switch 28, a control circuit 30, and a drive circuit 32. The set of gears 24 meshes with a gear rack 222 formed on one side of the tray 22. The motor 26 drives the tray 22 to linearly move between two positions by engaging with the set of gears 24 therebetween. The two positions include an unload position at which an optical disc can be placed on or removed from the tray 22 and a load position at which a recording and reproducing process can start.

The drive circuit 32 is coupled to the control circuit 30 for outputting a loading voltage for driving the tray 22 to move toward the load position and an unloading voltage for driving the tray 22 to move toward the unload position. Both the loading voltage and the unloading voltage are variable. Values of the loading voltage and the unloading voltage determine a rotational speed of the motor 16. The control circuit 30 is constructed and arranged for sending commands to the drive circuit 32, thus controlling the values of the loading voltage and the unloading voltage outputted by the drive circuit 32.

The switch 28 is disposed in the optical disc drive 20 for generating signals to indicate whether the tray 22 has reached the load position or the unload position. That is, when the tray 22 reaches the load position, the switch 28 generates a first signal and transmits the first signal to the control circuit 30. Upon receiving the first signal, the control circuit 30 controls the drive circuit 32 to stop outputting the loading voltage, so as to stop moving the tray 22. Contrarily, when the tray 22 reaches the unload position, the switch 28 generates a second signal and the second signal is transmitted to the drive circuit 32 so as to stop outputting the unloading voltage.

Figure 2:
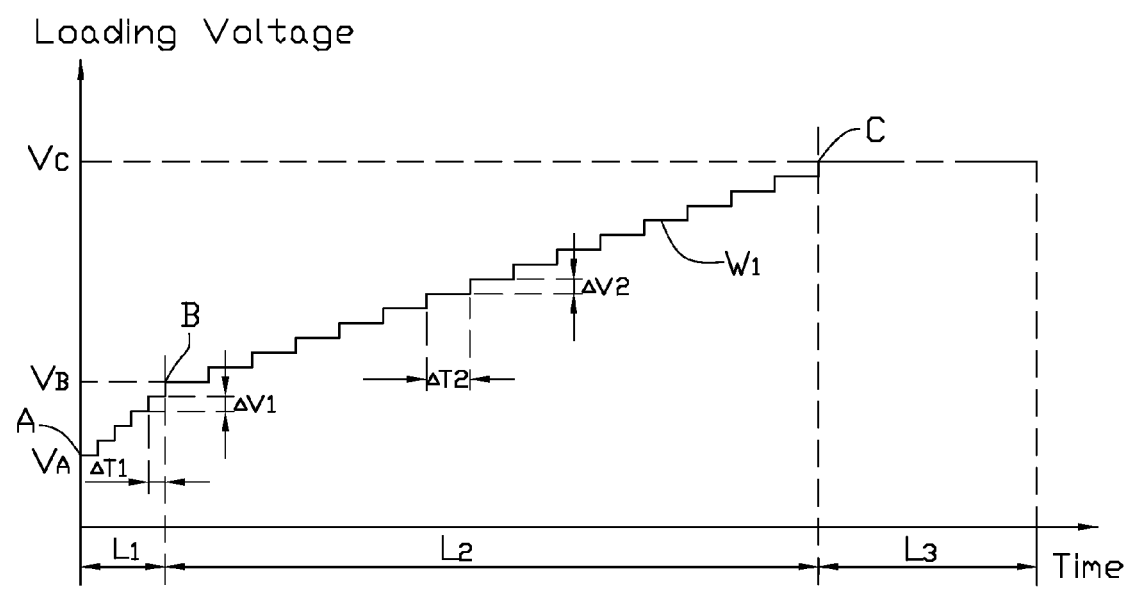
FIG. 2 is a schematic diagram showing a first embodiment of a waveform of a loading voltage applied to the motor of FIG. 1.

FIG. 2 shows a waveform W1 of the loading voltage in accordance with a first embodiment. The waveform W1 includes a first increasing stage L1, a second increasing stage L2, and a third constant stage L3.

The first increasing stage L1 represents an increasing voltage applied to the motor 26 initially. At a first beginning point A of the first increasing stage L1, the voltage value outputted by the drive circuit 32 is VA. The voltage value VA is a minimum voltage that can drive the motor 26 to start rotating. Typically, the voltage value VA is 140.625 mV. Since the voltage value VA is relatively low, the motor 26 rotates at a relatively low speed and the tray 22 moves smoothly.

The first increasing stage L1 includes multiple first steps, each representing a loading voltage value. A length of each first step represents a first time interval $\Delta T1$ of each first step. A height between two adjacent first steps represents a first increment $\Delta V1$ of the loading voltage value. During the first increasing stage L1, the loading voltage value increases by the first increment $\Delta V1$ after each first time interval $\Delta T1$. The loading voltage value remains constant during each of the first time interval $\Delta T1$. Thus the rotational speed of the motor 26 increases in steps, and a moving speed of the tray 22 increases in steps accordingly. Optimally, the first increment $\Delta V1$ is configured to be large enough to drive the motor 26 to accelerate at a proper acceleration so as to increase the moving speed of the tray 22, but small enough to prevent the tray 22 to vibrate. The tray 22 will move smoothly without heavy collision or vibrations, as there are no sudden high accelerations.

N1 denotes the number of the first steps in the first increasing stage L1. During the first increasing stage L1, a total loading voltage increment is N1·$\Delta V1$. At a first end point B of the first increasing stage L1, the loading voltage VB is VA+N1·$\Delta V1$. Preferably, the first time interval $\Delta T1$ is 10 ms, the number of the first steps N1 is set to 5, and the first increment $\Delta V1$ is 15.625 mV. The values of $\Delta T1$, N1 and $\Delta V1$ can be changed according to different optical disc drives.

After the first increasing stage L1, the second increasing stage L2 of the loading voltage is applied to the motor 26. Similarly, the second increasing stage L2 includes many second steps. A length of each second step in the second increasing stage L2 is identified as a second time interval $\Delta T2$. An increment of the loading voltage between each adjacent second steps in the second increasing stage L2 is identified as a second increment $\Delta V2$. N2 denotes the number of the second steps in the second increasing stage L2.

Each of the second time intervals $\Delta T2$ is longer than each of the first time intervals $\Delta T1$, and the second loading voltage increments $\Delta V2$ approximately equal to the first increments $\Delta V1$. The moving speed of the tray 22 increases in steps as the loading voltage increases.

The second increasing stage L2 begins at the first end point B of the first increasing stage L1 and ends at the second end point C. A total loading voltage increment during the second increasing stage L2 is N2·$\Delta V2$. At the second end point C, the loading voltage VC is VB+N2·$\Delta V2$. Preferably, the second time interval $\Delta T2$ is set to 40 ms, the number of the second steps N2 is set at 15, and the second increment $\Delta V2$ is configured to be 15.625 mV. As a result, the loading voltage increases to 234.375 mV during the second increasing stage L2. The values of $\Delta T2$, N2, and $\Delta V2$ can be changed according to different optical disc drives as well.

After the second increasing stage L2, the third constant stage L3 of the loading voltage is applied to the motor 26. The loading voltage in the third constant stage L3 is constant and remains at the voltage value VC. The tray 22 loads at a relatively high speed during the third constant stage L3.

When the tray 22 reaches the load position, the tray 22 triggers the switch 28 to generate the first signal to be transmitted to the control circuit 30. The control circuit 30 controls the drive circuit 32 to stop outputting the loading voltage after receiving the first signal, so as to stop moving the tray 22.

Figure 3:
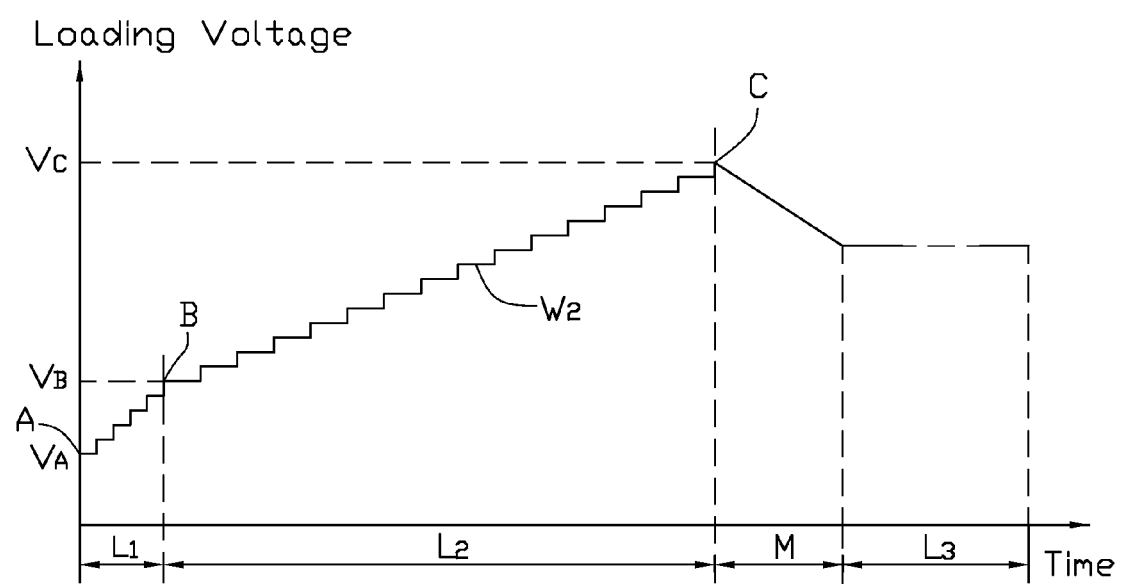
FIG. 3 is a schematic diagram showing a second embodiment of a waveform of a loading voltage applied to the motor of FIG. 1.

FIG. 3 shows a waveform W2 of the loading voltage in accordance with a second embodiment. Compared with the waveform W1 of FIG. 2, a decreasing stage M is added between the second increasing stage L2 and the third stage L3. In the decreasing stage M, the loading voltage decreases linearly. As a result, the voltage of the third constant stage L3 is lower than VC in the first embodiment. Thus the tray 22 moves at a relatively low speed when the tray 22 approaches the load position, and a sudden stop from a relatively high speed is avoided.

Figure 4:
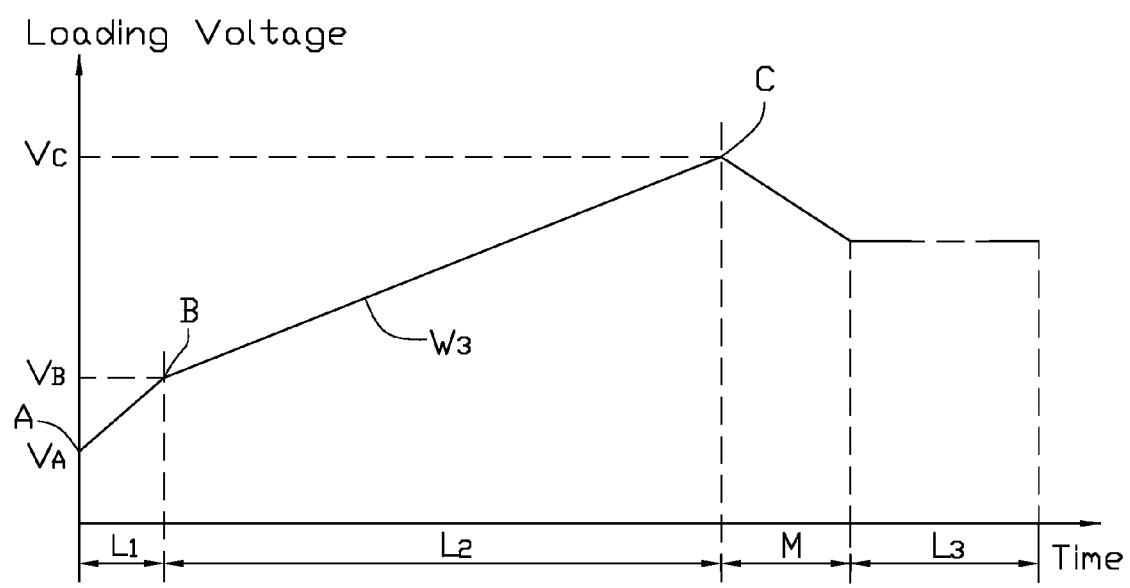
FIG. 4 is a schematic diagram showing a third embodiment of a waveform of a loading voltage applied to the motor of FIG. 1.

In other embodiments, the increasing or decreasing of the voltage can be implemented either linearly or in steps or a combination of both. As shown in FIG. 4, a waveform W3 of a loading voltage in accordance with a third embodiment is illustrated. The increasing and decreasing of the loading voltage are both implemented linearly.

In the first stage L1, the drive circuit 32 outputs a gradually increasing voltage and vibrations of the tray 22 at the start of loading are thus reduced. At the end of the loading process, the voltage decreases, slowing down the moving speed of the tray 22 so as to reduce the vibrations.

Figure 5:
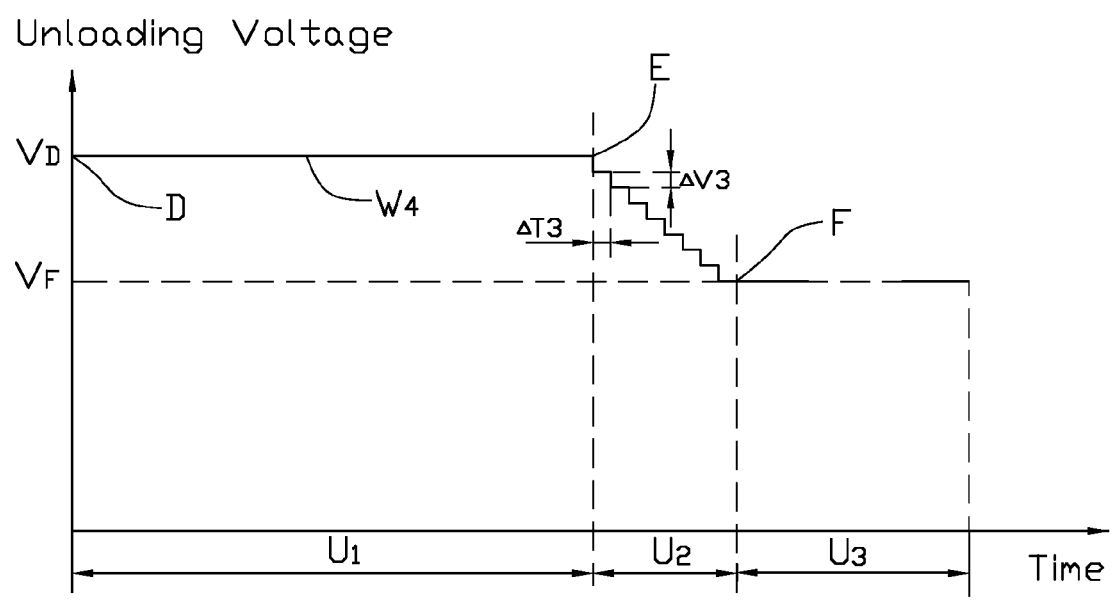
FIG. 5 is a schematic diagram showing a first embodiment of a waveform of an unloading voltage applied to the motor of FIG. 1.

FIG. 5 shows a waveform W4 of the unloading voltage in accordance with a first embodiment. The waveform W4 includes a first unloading constant stage U1, a second unloading decreasing stage U2 and a third unloading constant stage U3.

The first unloading constant stage U1 represents the unloading voltages applied to the motor 26 initially. At a second beginning point D of the first unloading constant stage U1, the unloading voltage value is VD. The tray 22 begins moving towards the unload position when the voltage VD is applied on the motor 26. Optimally, the voltage value VD is a minimum voltage that can drive the motor 26 to start rotating so as to move the tray 22. Typically, the voltage value VD is 421.875 mV. Since the unloading voltage is relatively low, the motor 26 rotates at a relatively low speed that will not cause vibrations.

During the first unloading constant stage U1, the unloading voltage remains at a constant voltage value VD. The constant voltage is kept for a first period T1. Typically, the first period T1 is 920 ms. The values of T1 and VD can be changed according to different optical disc drives.

After the first unloading constant stage U1, the second unloading decreasing stage U2 of the unloading voltage is applied to the motor 26. The second unloading decreasing stage U2 consists of many third steps, and $\Delta T3$, $\Delta V3$, and N3 denotes characteristics of the second unloading decreasing stage U2. $\Delta T3$ represents a third time interval. A first decrement $\Delta V3$ represents a decrement of the unloading voltage between each adjacent third steps in the second unloading decreasing stage U2. N3 denotes the number of the third steps in the second unloading decreasing stage U2.

The second unloading decreasing stage U2 starts at a third end point E and stops at a fourth end point F. During the second unloading decreasing stage U2, a total decrement of the unloading voltage is N3·ΔV3. At the fourth end point F, the unloading voltage VF is VD−N3·ΔV3. Preferably, the third time interval ΔT3 is set at 80 ms, the number of the third steps N3 is 8, and the third increment ΔV3 is configured to be at 15.625 mV. As a result, the unloading voltage decreases 125 mV during the second unloading decreasing stage U2. The values of ΔT3, N3, and ΔV3 can be changed according to different optical disc drives as well.

After the second unloading decreasing stage U2, the third unloading constant stage U3 of the unloading voltage is applied to the motor 26. The unloading voltage in the third unloading constant stage U3 is constant and remains at the voltage value VF. The tray 22 unloads at a relatively low speed when the motor 26 is driven by the unloading voltage at the voltage value VF.

When the tray 22 reaches the unload position, the tray 22 triggers the switch 28 to generate the second signal to be transmitted to the control circuit 30. The control circuit 30 controls the drive circuit 32 to stop outputting the unloading voltage based on the second signal, so as to stop moving the tray 22.

After the first unloading constant stage U1, the unloading voltage applied to the motor 26 decreases gradually in the second unloading decreasing stage U2. Thus the moving speed of the tray 22 decreases gradually, so as to prevent the tray 22 from vibrating. During the third unloading constant stage U3, the unloading voltage remains at the voltage value VF and the unloading speed of the tray 22 remains at a lower speed accordingly. Thus the unloading process will not cause vibrations.

Figure 6:
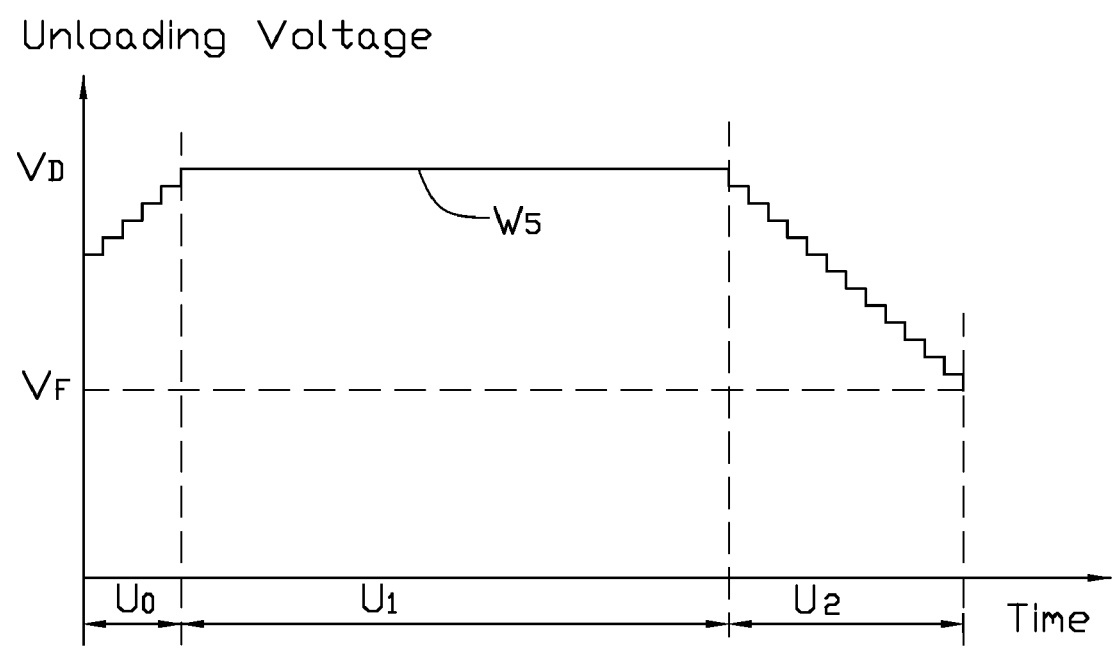
FIG. 6 is a schematic diagram showing a second embodiment of a waveform of an unloading voltage applied to the motor of FIG. 1.
Figure 7:
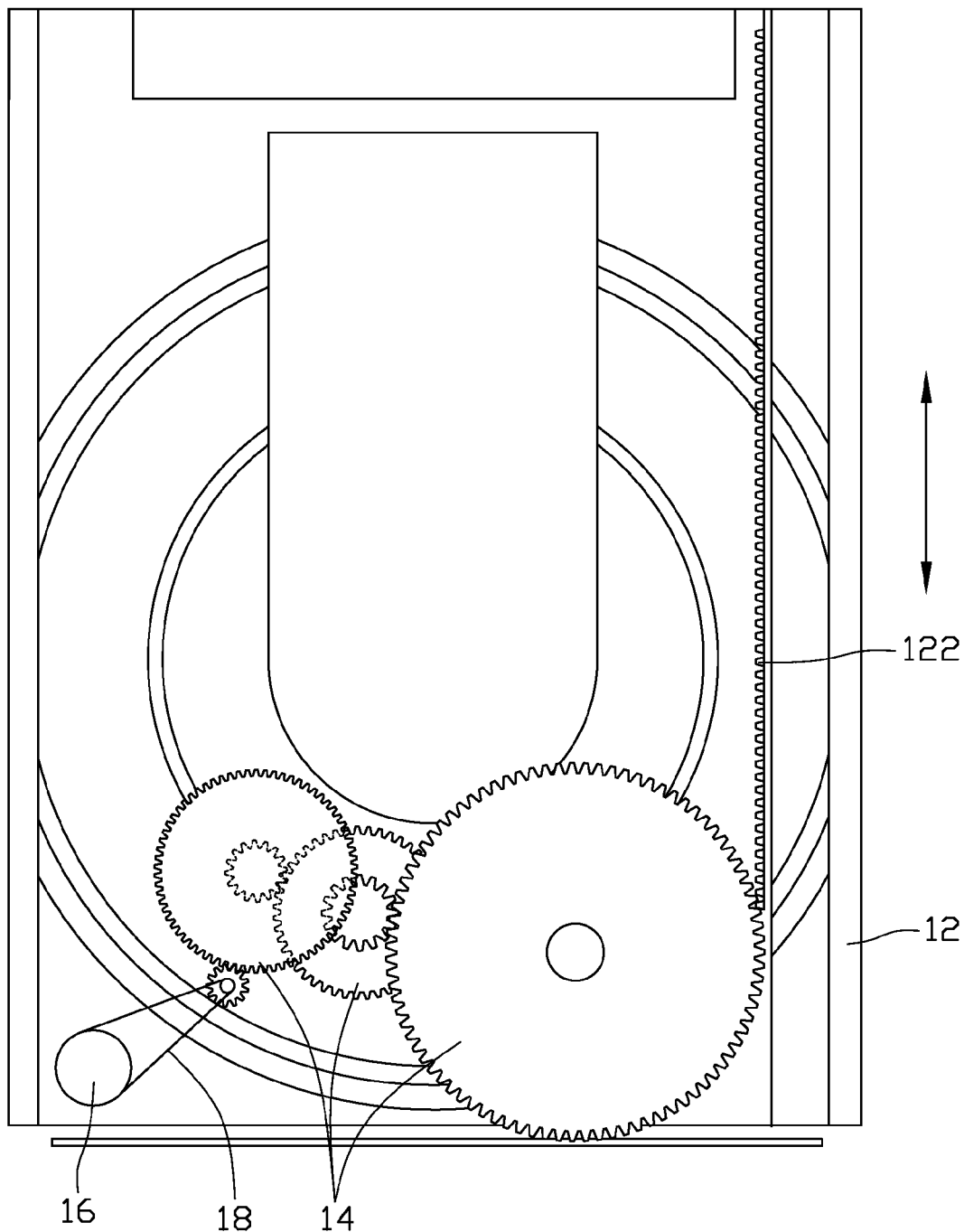
FIG. 7 is a plan view of a traditional optical disc drive, the traditional optical disc drive including a motor.
Figure 8:
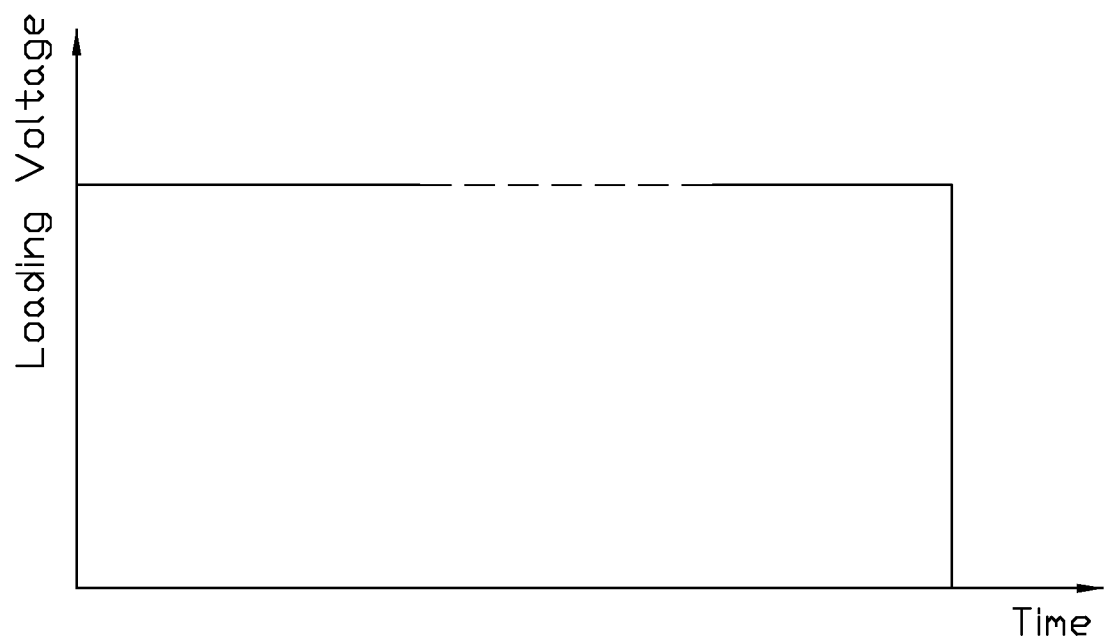
FIG. 8 is a schematic diagram showing a constant voltage applied to the motor of FIG. 7.

In other embodiments, as shown in FIG. 6, an unloading increasing stage U0 is employed to increase the unloading speed of the tray 22. The unloading speed increases gradually so as to maintain the stableness of the tray 22 when unloading starts. Furthermore, the second unloading decreasing stage U2 lasts until the tray 22 reaches the unload position.

In the second unloading decreasing stage U2, the drive circuit 32 outputs a gradually decreasing voltage and vibrations of the tray 22 at the end of unloading are thus reduced. During the unloading increasing stage U0, the unloading voltage increases gradually so as to reduce the vibrations.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A tray loading apparatus, comprising:
   a tray being movable between a load position and an unload position;
   a motor constructed and arranged for bringing the tray to move from the unload position to the load position; and
   a drive circuit for applying a loading voltage to the motor and the loading voltage includes at least one increasing stage;
   wherein at least one the increasing stage comprises at least one time interval, and the loading voltage is constant during the at least one time interval;
   wherein the at least one increasing stage comprises a first increasing stage and a second increasing stage, the first increasing stage includes multiple first steps and the second increasing stage includes multiple second steps, each of the first steps in the first increasing stage defines a first time interval, the loading voltage remains constant during the first time interval, each of the second steps in the second increasing stage defines a second time interval, the loading voltage remains constant during the second time interval, the first time interval is different from the second time interval.

2. The tray loading apparatus as claimed in claim 1, wherein the tray loading apparatus further comprises a control circuit to send commands to the drive circuit to control the loading voltage.

3. The tray loading apparatus as claimed in claim 2, wherein the tray loading apparatus further comprises a switch for signaling the control circuit to stop the drive circuit from outputting the loading voltage when the tray reaches the load position.

4. The tray loading apparatus as claimed in claim 1, wherein the loading voltage increases a predetermined increment after the at least one time interval.

5. The tray loading apparatus as claimed in claim 1, wherein the loading voltage remains at a constant value after the at least one increasing stage.

6. The tray loading apparatus as claimed in claim 1, wherein the loading voltage comprises a decreasing stage after the at least one increasing stage.

7. The tray loading apparatus as claimed in claim 1, wherein the first time interval is 10 ms and the second time interval is 40 ms.

8. The tray loading apparatus as claimed in claim 6, wherein the decreasing stage comprises at least one time interval, the loading voltage decreases a predetermined decrement after the at least one time interval.

9. A tray unloading apparatus, comprising:
   a tray being movable between a load position and an unload position;
   a motor constructed and arranged for bringing the tray to move from the load position to the unload position; and
   a drive circuit for applying an unloading voltage to the motor and the unloading voltage including at least one decreasing stage;
   wherein the at least one decreasing stage includes at least one time interval and the unloading voltage is constant during the at least one time interval, the unloading voltage remains at a constant value between an initial point where the unloading voltage is initially applied to the motor and a decreasing point where the unloading voltage staffs to decrease.

10. The tray unloading apparatus as claimed in claim 9, wherein the unloading voltage decreases a predetermined decrement after the at least one time interval.

11. The tray unloading apparatus as claimed in claim 9, wherein the unloading voltage remains at a constant value before the at least one decreasing stage, the unloading voltage increases before it remains at the constant value.

12. The tray unloading apparatus as claimed in claim 9, wherein the at least one decreasing stage lasts until the tray reaches the unload position.

13. The tray unloading apparatus as claimed in claim 9, wherein the at least one time interval is 80 ms.

14. An optical disc drive, comprising:
   a tray being movable between a load position and an unload position;

a motor for driving the tray to move between the load position and the unload position;

a drive circuit for outputting a voltage to drive the motor; and a control circuit for sending commands to the drive circuit to control the voltage applied to the motor, wherein the voltage comprise at least one increasing stage when loading the tray and at least one decreasing stage when unloading the tray;

wherein a waveform of the voltage for loading the tray and a waveform of the voltage for unloading the tray are different.

15. The optical disc drive as claimed in claim 14, wherein the at least one increasing stage comprises a first increasing stage and a second increasing stage, the first increasing stage includes multiple first steps and the second increasing stage includes multiple second steps, each of the first steps in the first increasing stage defines a first time interval, the loading voltage remains constant during the first time interval, each of the second steps in the second increasing stage defines a second time interval, the loading voltage remains constant during the second time interval, the first time interval is different from the second time interval.

16. The optical disc drive as claimed in claim 14, wherein when the voltage is applied for unloading the tray, the voltage remains at a constant value between an initial time point when the voltage is initially applied to the motor and a decreasing time point when the unloading voltage starts to decrease.

17. The optical disc drive as claimed in claim 14, wherein the first time interval is 10 ms and the second time interval is 40 ms.

18. The optical disc drive as claimed in claim 16, further comprising a switch for detecting the load position and the unload position of the tray, when the switch detects the tray reaches the load position or the unload position, the switch signals the control circuit to stop the drive circuit from outputting the voltage.

* * * * *